(12) United States Patent
Vedula

(10) Patent No.: US 8,321,381 B2
(45) Date of Patent: Nov. 27, 2012

(54) FACILITATING A SENDER OF EMAIL COMMUNICATIONS TO SPECIFY POLICIES WITH WHICH THE EMAIL COMMUNICATION ARE TO BE MANAGED AS A RECORD

(75) Inventor: Venkata Naga Ravikiran Vedula, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 1677 days.

(21) Appl. No.: 11/307,366

(22) Filed: Feb. 3, 2006

(65) Prior Publication Data
US 2007/0150521 A1    Jun. 28, 2007

(30) Foreign Application Priority Data

Dec. 19, 2005 (IN) ............................. 1854/CHE/2005

(51) Int. Cl.
*G06F 17/00* (2006.01)
(52) U.S. Cl. ........................................ 707/662; 707/654
(58) Field of Classification Search ................. 707/204; 726/26; 725/132; 709/206
See application file for complete search history.

(56) References Cited

U.S. PATENT DOCUMENTS

| | | | |
|---|---|---|---|
| 2007/0094311 A1* | 4/2007 | Pelletier et al. | 707/204 |
| 2007/0192818 A1* | 8/2007 | Bourges-Sevenier et al. | 725/132 |
| 2007/0244974 A1* | 10/2007 | Chasin | 709/206 |
| 2007/0261121 A1* | 11/2007 | Jacobson | 726/26 |

* cited by examiner

*Primary Examiner* — Shahid Alam
(74) *Attorney, Agent, or Firm* — Narendra Reddy Thappeta

(57) ABSTRACT

Specifying the policies with which (portion of) an email communication is to be stored as a record, within the content of the email communication. In an embodiment, an attachment file specifies such policies in the form of XML tags. As a result, a user may merely need to attach a file specifying the desired policies, and send the email communication. In one implementation, the user specifies a pre-specified email address as a recipient to cause the email communication to be saved as a record.

9 Claims, 4 Drawing Sheets

305: <RecordName> SalesDeal.doc </RecordName>
310: <RecordCategory> SalesDealCategory </RecordCategory>
315: <RecordPolicy>
320: <Retain> 1 YR </Retain>
325: </RecordPolicy>
330: <RecordContent> binary content </RecordContent>

FACILITATING A SENDER OF EMAIL COMMUNICATIONS TO SPECIFY POLICIES WITH WHICH THE EMAIL COMMUNICATION ARE TO BE MANAGED AS A RECORD

RELATED APPLICATIONS

The present application is related to and claims priority from the co-pending India Patent Application entitled, "Facilitating a Sender of Email Communications to Specify Policies With Which the Email Communication are to be Managed as a Record", Serial Number: 1854CHE/2005, Filed: 19 Dec. 2005, naming the same inventors as in the subject patent application.

BACKGROUND OF THE INVENTION

1. Field of the Invention

The present invention relates to management of electronic records, and more specifically to a method and apparatus facilitating a sender of email communications to specify policies with which the email communication are to be managed as a record.

2. Related Art

Electronic mail communications (Emails) are often used for communicating a desired content/message. In a common scenario, a user generally uses a convenient interface such as a web-browser or email client system to compose the content of interest and send the composed content to desired recipients in the form of a email communication.

In general, an email communication, as transmitted to a recipient, contains various portions such as a header (specifying the information on the sender, the recipients, priority, the route the email has taken thus far, etc.), a body containing the composed content which the sender wishes to send, any files specified as attachments, and a signature identifying the sender.

There is often a need to manage a record of email communications. Managing a record generally entails preserving a copy of the email communication. The records may be maintained electronically, in which case the preserved record is referred to as an electronic record. Such maintenance of records is often necessitated by regulatory policies implemented by the Government, by the industry or even the organization of the sender/recipient.

Records are often maintained consistent with associated policies. Policies generally specify aspects such as the duration of retention of the record, the security level to be accorded the record during retention, the medium/location at which the record is to be maintained, the disposition (e.g., when the record can be destroyed) of the records, etc.

According to one approach, the policies for each electronic record are pre-specified on a server system, which manages the records. The policies may in turn be set according to various (combination of) considerations such as the folder/directory in which the email is eventually stored, the sender email address, and recipient email address.

One problem with the prior approach of above is that the sender of email may not have a desired level of control over the record management policies, particularly for each email communication. It may be desirable for the sender to have more control (e.g., specify policies associated with each email communication) over the policies in several environments.

BRIEF DESCRIPTION OF THE DRAWINGS

The present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

According to an aspect of the present invention, an email communication itself contains data specifying a policy with which the email communication is to be managed as a record. Accordingly, a server may receive the email communication and store the email communication as record associated with the specified policy.

In an embodiment, the policies are specified in a file included as an attachment in the email communication. Accordingly, a user may attach a file specifying desired policies in the email communications. The policies may be specified consistent with extended meta language (XML) well known in the relevant arts.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the features of the invention.

2. Example Environment

Figure 1:
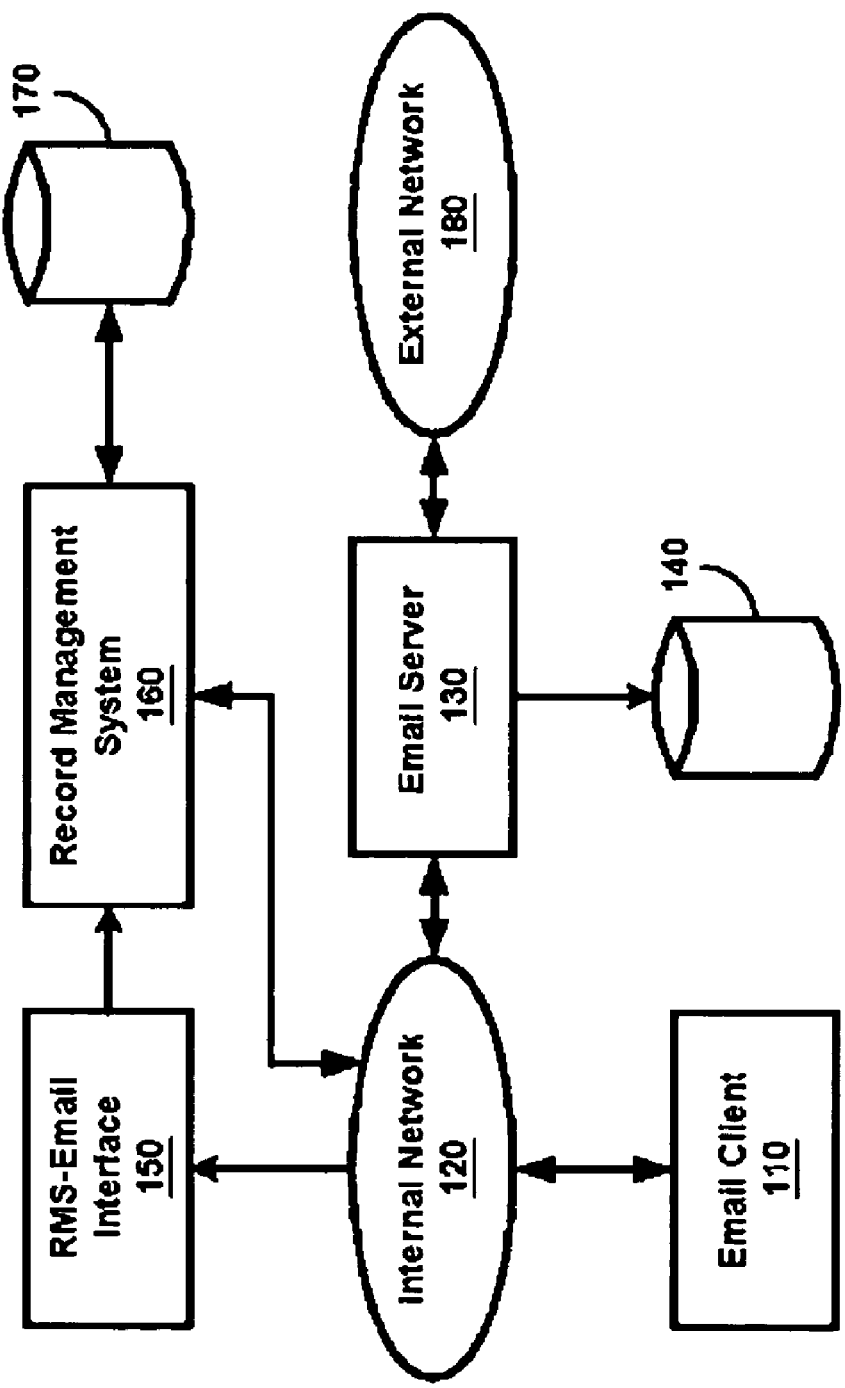
FIG. 1 is a block diagram of an example environment in which various aspects of the present invention can be implemented.

FIG. 1 is a block diagram illustrating an example environment in which various aspects of the present invention can be implemented. The environment is shown containing email client 110, internal network 120, email server 130, local storage(s) 140 and 170, RMS-email interface 150, record management system (RMS) 160, and external network 180. Each system is described in further detail below.

Internal network 120 provides necessary communication between email client 110, email server 130, RMS-email interface 150, and RMS 160 using protocols such as TCP/IP well known in the relevant arts. External network 180 represents another network using which connectivity is provided to external systems (not shown), and may also be implemented using IP protocol.

Email client 110 enables a sender to compose and send email communications (emails) using a suitable interface (e.g., email client or web interface). In an embodiment, email client 110 is configured to forward all email communications to email server 130. Alternatively, email client 110 may be configured with more complex email routes, which forward different groups of email communications to different email servers. In general, email client 110 may correspond to systems such as personal computers, mobile phones, PDAs, etc.

Email server 130 forwards to appropriate next system each of the emails received from email client 110. The specific system to be forwarded to is identified by an email address (e.g., user-id@domainname.com) of the recipient. Local storage 140 may be used to buffer the emails while processing the emails.

RMS 160 is used to maintain records according to corresponding associated policies. The records may be stored on local storage 170. RMS 160 may provide a convenient interface using which RMS-email interface 150 can store email communications as records with desired policies. RMS 160 may send notifications on internal network 120 to the users (e.g., senders and recipients) of the records informing actions such as removal of records (after the desired retention period).

RMS-email interface 150 receives emails generated from email client 110 and stores the emails as records in RMS 160. The emails may be received either by having the user specify a pre-specified email address as one of the recipient addresses (which would cause the mail to be delivered to RMS-email interface 150 by email server 130) or by having email server 130 automatically forward the emails sought to be maintained as records. RMS-email interface 150 maintains emails as records in RMS 160 according to policies which may be specified by users, as described below in further detail.

3. Specifying Policies to Manage Email Communications as Records

Figure 2:
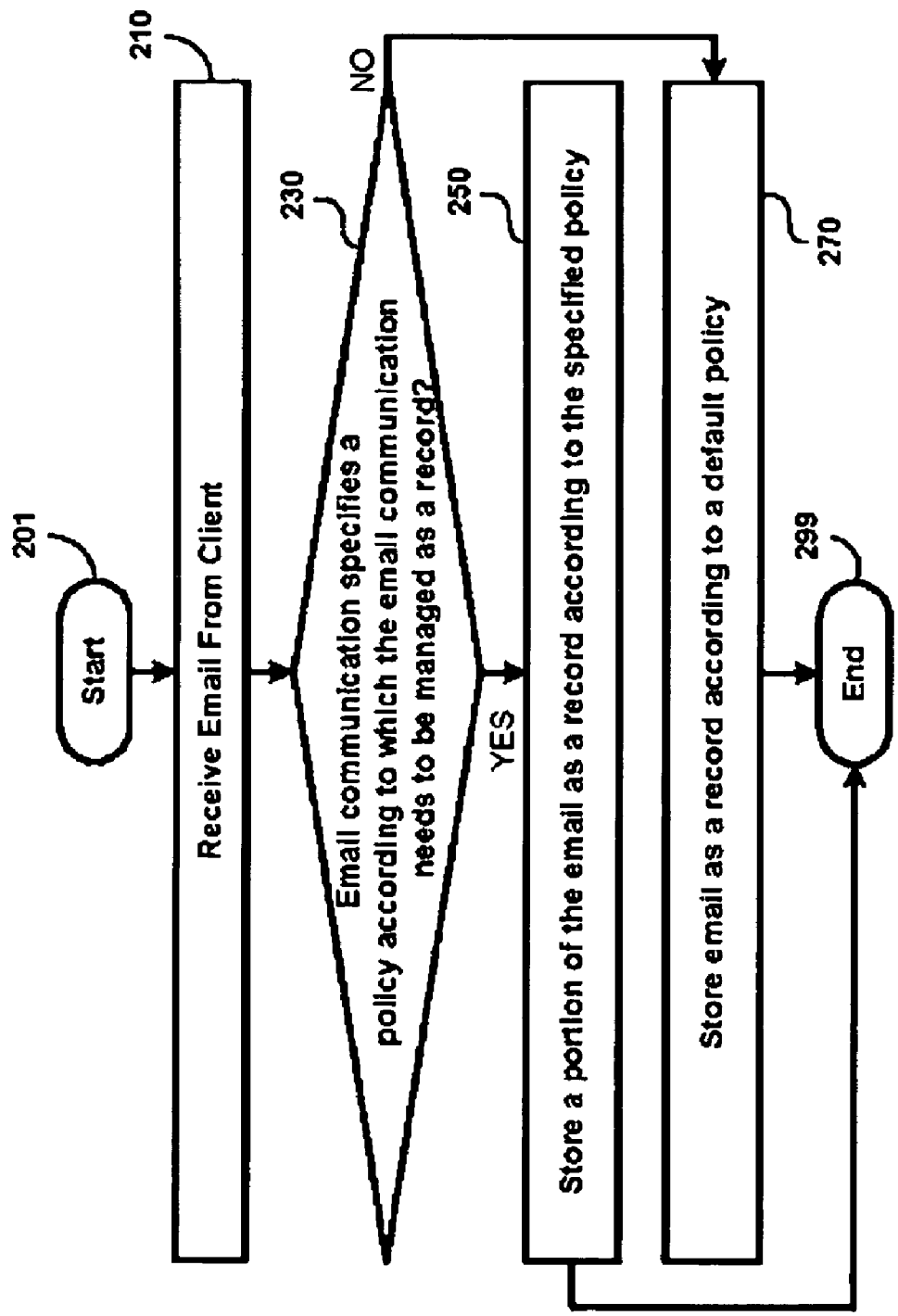
FIG. 2 is a flowchart illustrating the manner in which a sender of email communication can send a email communication specifying the policy to be used for the management of the email communication as a record according to an aspect of the present invention.

FIG. 2 is a flowchart illustrating the manner in which a sender of email communication can specify the policies to be used in maintaining the communications as records according to an aspect of the present invention. The flowchart is described with respect to FIG. 1 merely for illustration. The features can however be implemented in other environments as will be apparent to one skilled in the relevant arts by reading the disclosure provided herein.

In step 210, RMS-email interface 150 receives an email communication from email client 110. The email communication may be received on internal network 120 or other suitable communication path.

In step 230, RMS-email interface 150 checks if the email communication specifies a policy to be used to manage the email communication as a record. In general, the policy can be specified by any portion (e.g., within header according to a pre-specified convention) of the email communication. However, in an embodiment described below, the policies are specified by an attachment included as a part of the email communication. Control passes to step 240 if policies are specified, and to step 270 otherwise.

In step 240, RMS-email interface 150 stores at least a portion of the email communication (e.g., the composed content) as a record in RMS 160. In general, the storing operation can be performed using any protocol provided by RMS 160. Thus, RMS-email interface 150 needs to be implemented consistent with the protocol provided by RMS 160. One of several RMS (e.g., Oracle Records Management 10 g product available from Oracle Corporation, the assignee of the subject patent application) available in the market place may be conveniently used as RMS 160 for storing the email communications as record.

In step 270, RMS-email interface 150 stores the email communication as a record using default policies, which can be configured by an administrator. The default policies may be configured either in RMS-email interface 150 or RMS 160. The flowchart ends in step 299.

It may thus be appreciated that the specific policies used to maintain records of email communications is determined based on the contents of the email communication itself. As noted above, the policies can be specified by an attachment (as a part of the email communication), as illustrated below with an example.

4. Attachment Specifying Policies

Figures 3, 4:
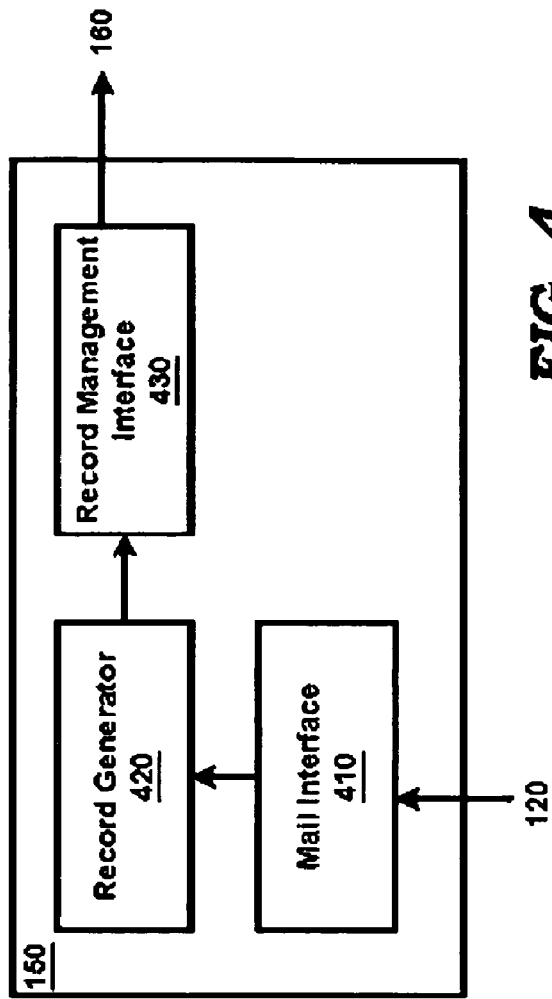
FIG. 3 depicts the content of a email attachment specifying a desired policy for managing the email communication as a record in an embodiment of the present invention.
FIG. 4 is a block diagram illustrating the details of a RMS-email interface in one embodiment.

FIG. 3 depicts the contents of a file (sent as an attachment to an email communication) to specify the policies to be used when managing the email communication as record. Merely for illustration, the policies are specified in XML format. However, any other convention can be used to specify the policies in the file attachment. Each line of the file is described below in further detail.

Line 305 specifies that the email communication (or a portion thereof needs to be stored as a record having name "SalesDeal.doc", and line 310 indicates that the record is to be stored under the category "SalesDealCategory". Such a policy is specified assuming that RMS 160 permits records to be managed in the form of categories (or groups) and that each record within the category is identified by a unique name. Thus, the combination of lines 305 and 310 causes the email communication to be stored in RMS 160 in the category "SalesDealCategory" and with a record having unique name "SalesDeal.doc".

Lines 315-325 specify the specific policies to be used by RMS 160 in storing the email communications as records. For illustration, only one policy is shown specified in line 320, which indicates that the record is to be retained for 1 year. Line 330 contains tag <RecordContent>, which specifies that comments "binary content" is to be stored along with the record.

Thus, when the file of FIG. 3 is attached in an email communication, RMS 160 may store the email communication (possibly including the attachment specifying the policies) in category "SalesDealCategoy" having a record name of "SalesDeal.doc", and sets the retention period equal to one year (along with comment "binary content").

The features thus described can be implemented in various embodiments. The description is continued with respect to example embodiments.

5. RMS-Email Interface

FIG. 4 is a block diagram illustrating the details of RMS-email interface 150 in one embodiment. The block diagram is shown containing mail interface 410, record generator 420, and RMS interface 430. Each block is described below in further detail below.

Mail interface 410 receives email communications (including any attachments) according to a suitable protocol (e.g., POP), and forwards the emails to record generator 420. As noted above, the emails may contain a pre-specified email address as one of the recipients and thus the email may be received by mail interface 410. Alternatively (as also noted above), the emails may be automatically forwarded by email server 130 when an attachment indicates that the email is to be maintained as a record.

Record generator 420 examines each email communications to determine the policies to be used in maintaining the email communication as a record. Record generator 420 also generates the record content based on the specific portions of the email sought to be stored, and forwards the generated record along with the determined policies to RMS interface 430.

RMS interface 430 interfaces with RMS 160 to store the record (received from record generator 420) with the specified policies. In general RMS-email interface 150 needs to be implemented consistent with the interface exposed by RMS 160 and thus depends on the implementation of RMS 160. The implementation of RMS interface 430 will be apparent to one skilled in the relevant arts based on the protocol interface exposed by RMS 160. As noted above, several RMS products available in the market place expose such an interface, and RMS interface 430 can conveniently use the exposed interfaces. For example, Oracle Records Management 10 g product exposes Web Service interfaces so that clients can interact with RMS via SOAP/XML.

It should be further appreciated that the features described above can be implemented in various embodiments as a desired combination of one or more of hardware, software and firmware. The description is continued with respect to an embodiment in which various features are operative when software instructions are executed.

6. Digital Processing System

Figure 5:
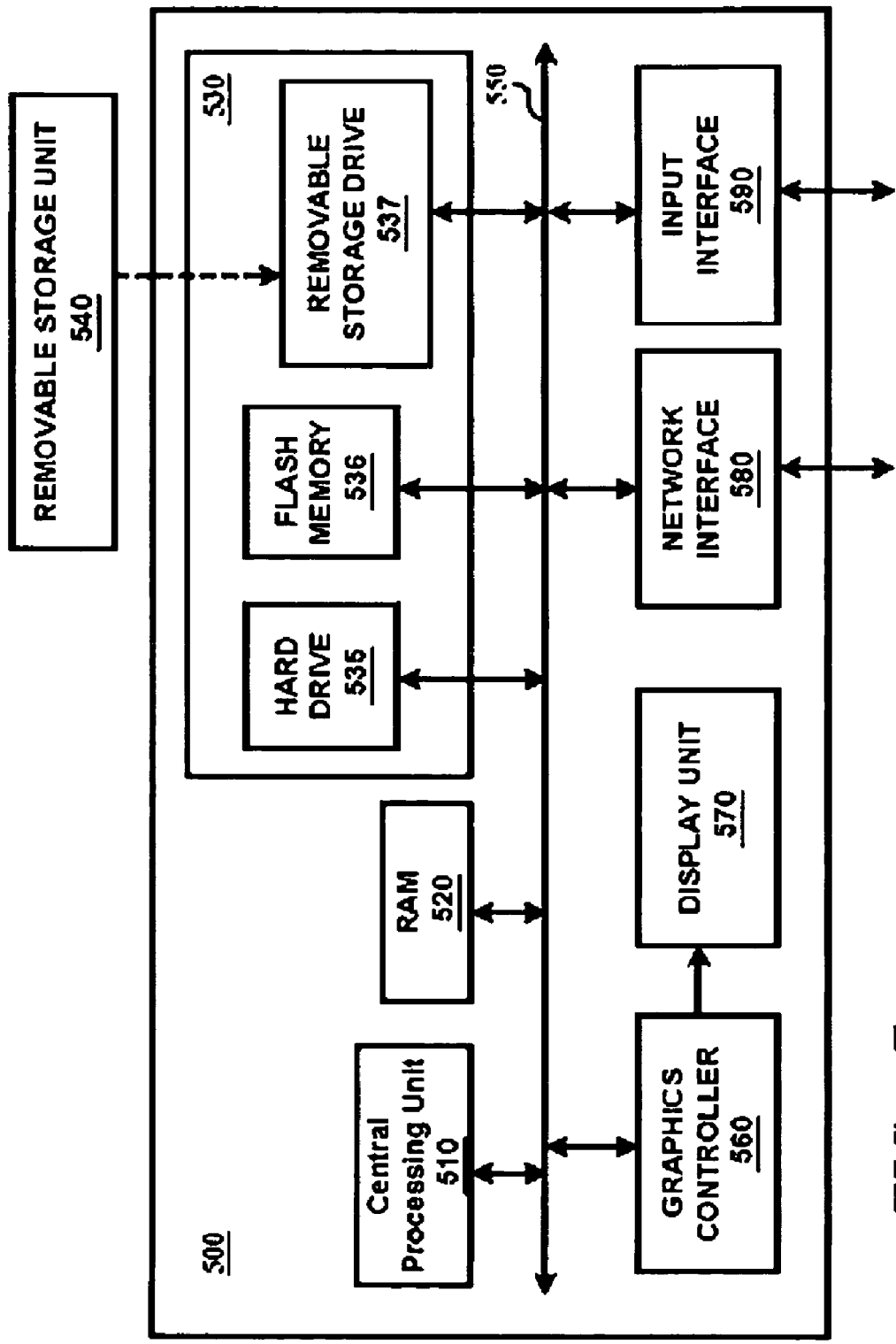
FIG. 5 is a block diagram illustrating an example embodiment in which various aspects of the present invention are operative when software instructions are executed.

FIG. 5 is a block diagram illustrating the details of digital processing system 500 in which various aspects of the present invention are operative by execution of appropriate software instructions. System 500 may correspond to RMS-email interface 150 or email client 110. System 500 may contain one or more processors such as central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present invention. In the case of email client 110, execution of instructions enables a user to compose an email (including attaching a file specifying the policies as described above) and specifying a pre-specified email address (which would cause the email to be delivered to RMS-email interface 150) as a recipient. In the case of RMS-email interface 150, the features noted above with respect to FIGS. 2 and 4 may be caused to be provided.

CPU 510 may contain multiple processing units, with each processing unit potentially being designed for a specific task. Alternatively, CPU 510 may contain only a single general purpose processing unit. RAM 520 may receive instructions from secondary memory 530 using communication path 550.

Graphics controller 560 generates display signals (e.g., in RGB format) to display unit 570 based on data/instructions received from CPU 510. Display unit 570 contains a display screen to display the images defined by the display signals. Input interface 590 may correspond to a key-board and/or mouse. Network interface 580 provides connectivity to a network (e.g., using Internet Protocol), and may be used to communicate with the other systems of FIG. 1.

Secondary memory 530 may contain hard drive 535, flash memory 536 and removable storage drive 537. Secondary memory 530 may store the data and software instructions (e.g., methods instantiated by each of client system), which enable system 500 to provide several features in accordance with the present invention. Some or all of the data and instructions may be provided on removable storage unit 540, and the data and instructions may be read and provided by removable storage drive 537 to CPU 510. Floppy drive, magnetic tape drive, CD-ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable storage medium having stored therein computer software and/or data.

In this document, the term "computer program product" is used to generally refer to removable storage unit 540 or hard disk installed in hard drive 535. These computer program products are means for providing software to system 500. CPU 510 may retrieve the software instructions, and execute the instructions to provide various features of the present invention described above.

7. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents. Also, the various aspects, features, components and/or embodiments of the present invention described above may be embodied singly or in any combination in a data storage system such as a database system.

What is claimed is:

1. A computing system comprising:
 a storage to maintain the content of email communications as corresponding records;
 a client system to enable a user to compose a desired content as a part of a email communication, to include a data specifying a retention policy in said email communication and to send said email communication on a network, wherein said retention policy indicates a duration for which said desired content is to be maintained as a corresponding record in said storage; and
 a server system to receive said email communication on said network and to store said desired content as said corresponding record in said storage according to said retention policy specified in said email communication.

2. The computing system of claim 1, wherein said email communication includes a first email address and a second email address, wherein said first email address is of a first recipient to which said email communication is to be delivered, said second email address identifying said server system, said computing system further comprising:
 a email server, wherein said client system is designed to forward said email communication to said email server, said email server further forwarding said email communication to said first recipient in response to the presence of said first email address in said email communication, said email server also to forward said email communication to said server system in response to the presence of said second email address in said email communication, wherein said server system stores said desired content upon receiving said email communication from said email server.

3. The computing system of claim 2, wherein said desired content comprises a body of said email communication and a plurality of attachments, wherein said retention policy is specified as one of said plurality of attachments, wherein said server system stores said body and said plurality of attachments as said corresponding record in said storage.

4. The computing system of claim 3, wherein said retention policy further indicates one or more of a security level to be accorded to said corresponding record in said storage, a location in said storage at which said record is to be stored, said duration, and a time at which said record is to be destroyed.

5. A method of maintaining records of email communications according to desired policies, said method comprising:

receiving an email communication, wherein said email communication includes a content included by a sender while composing said email communication, said email communication further including a policy according to which said content composed by said sender of said email communication is to be managed as a record; and storing said content of said email communication as said record according to said policy included in said email communication, wherein said policy is a retention policy indicating a duration for which said content of said email communication is to be stored as said record, said method further comprising:

removing said record containing said content after said duration.

6. The method of claim 5, further comprising storing said content as said record with a default policy if said email communication does not specify said policy.

7. The method of claim 5, wherein said policy is specified as an attachment contained in said email communication.

8. The method of claim 7, wherein said policy is specified using extended meta language (XML) as content of said attachment.

9. The method of claim 7, wherein said email communication contains a recipient address which causes said email communication to be delivered to a RMS-email interface which performs said receiving and said storing.

* * * * *

UNITED STATES PATENT AND TRADEMARK OFFICE
CERTIFICATE OF CORRECTION

PATENT NO. : 8,321,381 B2
APPLICATION NO. : 11/307366
DATED : November 27, 2012
INVENTOR(S) : Vedula Page 1 of 1

It is certified that error appears in the above-identified patent and that said Letters Patent is hereby corrected as shown below:

In column 4, line 23, delete "thereof" and insert -- thereof) --, therefor.

In column 4, line 43, delete ""SalesDealCategoy"" and insert -- "SalesDealCategory" --, therefor.

Signed and Sealed this
Twenty-sixth Day of February, 2013

Teresa Stanek Rea
*Acting Director of the United States Patent and Trademark Office*